US010298647B2

(12) United States Patent
Walker et al.

(10) Patent No.: US 10,298,647 B2
(45) Date of Patent: May 21, 2019

(54) DELAY COMPENSATION FOR BROADCAST ADAPTIVE BITRATE STREAMING

(71) Applicant: QUALCOMM Incorporated, San Diego, CA (US)

(72) Inventors: Gordon Kent Walker, Poway, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 178 days.

(21) Appl. No.: 15/049,974

(22) Filed: Feb. 22, 2016

(65) Prior Publication Data

US 2016/0255129 A1 Sep. 1, 2016

Related U.S. Application Data

(60) Provisional application No. 62/126,089, filed on Feb. 27, 2015, provisional application No. 62/121,303, filed on Feb. 26, 2015.

(51) Int. Cl.

| | |
|---|---|
| ***H04L 29/06*** | (2006.01) |
| ***H04L 12/26*** | (2006.01) |
| ***H04L 29/08*** | (2006.01) |
| ***H04N 21/262*** | (2011.01) |
| ***H04N 21/43*** | (2011.01) |

(Continued)

(52) U.S. Cl.

CPC ........ *H04L 65/601* (2013.01); *H04L 43/0852* (2013.01); *H04L 69/326* (2013.01); *H04N 21/26258* (2013.01); *H04N 21/4302* (2013.01); *H04N 21/4424* (2013.01); *H04N 21/8456* (2013.01)

(58) Field of Classification Search

CPC . H04L 65/601; H04L 43/0852; H04L 69/326; H04N 21/2658; H04N 21/4302; H04N 21/4424; H04N 21/8456

See application file for complete search history.

(56) References Cited

U.S. PATENT DOCUMENTS

2005/0141471 A1* 6/2005 Virtanen ................ H04L 45/00 370/342

2005/0207387 A1* 9/2005 Middleton ............ H04J 3/0664 370/347

(Continued)

FOREIGN PATENT DOCUMENTS

WO 2014076052 A1 5/2014

OTHER PUBLICATIONS

International Search Report and Written Opinion—PCT/US2016/019045—ISA/EPO—dated May 3, 2016.

*Primary Examiner* — Blake J Rubin

(74) *Attorney, Agent, or Firm* — The Marbury Law Group

(57) ABSTRACT

Systems, methods, and devices of the various embodiments enable managing a start time of media content in a media receiver device. A processor of the receiver device may receive media content labeled with a transmission time from a sending device. The processor may determine a service construction delay of the media content of the media content. The processor may determine a time offset of the media content based on the service construction delay. The processor may deliver the media content to a streaming media client in the receiver device using the time offset.

64 Claims, 8 Drawing Sheets

(51) Int. Cl.
*H04N 21/442* (2011.01)
*H04N 21/845* (2011.01)

(56) References Cited

U.S. PATENT DOCUMENTS

2008/0216116 A1* 9/2008 Pekonen .......... H04N 21/23614 725/39
2008/0285945 A1* 11/2008 Rajakarunanayake ...................... H04N 21/4325 386/235
2009/0021572 A1* 1/2009 Garudadri ............... H04L 47/10 348/14.01
2009/0161629 A1* 6/2009 Purkayastha ..... H04W 36/0011 370/331
2009/0252134 A1* 10/2009 Schlicht ................ H04L 1/0015 370/338
2009/0319845 A1* 12/2009 Liu ................... H03M 13/3761 714/747
2009/0327842 A1* 12/2009 Liu ....................... H04L 1/0057 714/776
2010/0165856 A1* 7/2010 Melpignano .......... H04W 28/22 370/252
2010/0188975 A1* 7/2010 Raleigh ............ G06Q 10/06375 370/230.1
2011/0116406 A1* 5/2011 Racz ....................... H04L 47/10 370/252
2011/0134766 A1* 6/2011 Zampetti ............... H04J 3/0682 370/252
2011/0231569 A1* 9/2011 Luby ................ H04N 21/23106 709/234
2012/0011265 A1* 1/2012 Curcio .............. H04N 21/2402 709/231
2012/0155360 A1* 6/2012 Peters ..................... H04L 12/18 370/312
2012/0198031 A1* 8/2012 Bouazizi ............. H04L 65/4084 709/219
2012/0259946 A1* 10/2012 Stockhammer ....... H04L 65/105 709/217
2012/0300769 A1 11/2012 Narbutt
2013/0010705 A1* 1/2013 Jonsson ............ H04W 28/0205 370/329
2013/0031575 A1* 1/2013 Gallant ............... H04L 41/5038 725/20
2013/0262567 A1 10/2013 Walker et al.
2013/0329777 A1* 12/2013 Konda .................... H04L 67/04 375/240.01
2014/0189052 A1 7/2014 Gholmieh et al.
2014/0328357 A1* 11/2014 Fredriksson .......... H04J 3/0614 370/520
2014/0348184 A1 11/2014 Kure
2015/0029950 A1* 1/2015 Rath ................. H04W 72/0413 370/329
2015/0104173 A1* 4/2015 Sun .................... H04Q 11/0071 398/67
2015/0264136 A1* 9/2015 Hall ........................ H04L 65/60 709/248
2016/0072637 A1* 3/2016 Gholmieh ........... H04L 65/4076 709/219
2016/0094802 A1* 3/2016 Thomas ................. H04N 5/913 386/260
2016/0198218 A1* 7/2016 Kwon ..................... H04L 69/24 725/131
2016/0227263 A1* 8/2016 Lee ...................... H04N 21/236
2016/0261893 A1* 9/2016 Oh ....................... H04N 21/238
2017/0055046 A1* 2/2017 Lee ...................... H04N 21/234
2017/0104801 A1* 4/2017 Ver Steeg ............... H04L 65/60
2017/0163363 A1* 6/2017 Yang ...................... H04H 20/65

* cited by examiner

DELAY COMPENSATION FOR BROADCAST ADAPTIVE BITRATE STREAMING

RELATED APPLICATIONS

This application claims the benefit of priority to U.S. Provisional Application No. 62/121,303 entitled "Delay Compensation For Broadcast Adaptive Bitrate Streaming" filed Feb. 26, 2015, and to U.S. Provisional Application No. 62/126,089 entitled "Delay Compensation For Broadcast Adaptive Bitrate Streaming" filed Feb. 27, 2015, the entire contents of both of which are hereby incorporated by reference.

BACKGROUND

Adaptive bitrate streaming is a technique used in streaming media data (such as video, audio, and other multimedia data) over a communication network. Examples of adaptive bitrate streaming techniques include Dynamic Adaptive Streaming over Hypertext Transfer Protocol (HTTP) (DASH), Adobe Dynamic Streaming for Flash, Apple HTTP Live Streaming ("HLS"), and Microsoft Smooth Streaming. DASH is a streaming standard supporting adaptive streaming using the HTTP protocol. In one variant of DASH, media intervals may be composed of one or more layered chunks, and each additional layered chunk added to a base layer chunk may increase the quality of the media presentation for that media interval. Each media presentation may be encoded using a scalable encoder such that each media interval includes a base layer chunk and one or more enhanced layer chunks.

Streamed content data (e.g., media content) is received and rendered in a receiver device by a client application, such as a streaming media client. Among other delays, received content data may be subject to delays due to handling of the content data by a protocol stack of the receiver device. While the receiver device may be configured to anticipate a certain level of delay, if there is more or less delay than anticipated, performance of the streaming media client may be adversely affected. For example, the streaming media client may begin presentation of content data, or the streaming media client may launch, either too early or too late. When the streaming media client begins to present the content data too early, presentation stalls may result due to lack of sufficient data for smooth presentation of content. When the streaming media client begins to present the content data too late, among other things, the streaming media client may delay presentation of the content data longer than strictly necessary, degrading the channel change performance and increasing overall latency unnecessarily.

SUMMARY

The various embodiments include methods that may be implemented on a receiver device for managing a start time of media content. Various embodiments may include receiving, by a processor of the receiver device, media content labeled with a transmission time from a sending device, determining, by the processor, a service construction delay of the media content, determining, by the processor, a time offset of the media content based on the service construction delay, and delivering, by the processor, the media content to a streaming media client using the time offset.

Some embodiments may further include determining, by the processor, a start time of the media content based on the determined time offset, wherein delivering, by the processor, the media content to a streaming media client using the time offset includes delivering, by the processor, the media content to the streaming media client based on the start time. Some embodiments may further include determining, by the processor, a protocol stack delay of the media content.

In some embodiments, determining the protocol stack delay of the media content may include determining, by the processor, a local time of the receiver device, and comparing, by the processor, the transmission time with the local time of the receiver device. In such embodiments, determining the time offset of the media content may include determining the time offset based on the protocol stack delay.

In some embodiments, determining, by the processor, the service construction delay of the media content may include determining the service construction delay based on a transport layer presentation time of the media content. Some embodiments may further include receiving, by the processor, a request for a byte range of the media content, wherein determining the service construction delay of the media content may include determining the service construction delay based on a service construction delay for the requested byte range of the media content.

In some embodiments, in response to a request from a client application to a transport layer of a protocol stack for media content arriving before the requested media content is fully present in a transport buffer, the transport layer of the protocol stack may interpret the request as a request for byte range delivery of the requested media content. In some embodiments, determining the start time of the media content based on the determined time offset may include determining a sum of a determined protocol stack delay of the media content and a transport layer presentation time. In some embodiments, the protocol stack delay of the media content may include a delay time due to processing of the media content by a protocol stack of the receiver device.

In some embodiments, determining a protocol stack delay of the media content may include determining the protocol stack delay after a media content portion of the media content is processed by a transport layer of a protocol stack of the receiver device. In some embodiments, determining a protocol stack delay of the media content may include retrieving a predetermined protocol stack delay value from a memory of the receiver device. In some embodiments, determining a start time of the media content may include modifying, by the processor, a media presentation description of the media content based on the time offset, and determining, by the processor, a start time of the media content based on the modified media description presentation.

In some embodiments, determining a start time of the media content may include modifying, by the processor, a local time of the receiver device based on the time offset, and determining, by the processor, a start time of the media content based on the modified local time. In some embodiments, the media content may include a header portion labeled with the transmission time from the sending device. Some embodiments may further include creating, by the processor, a timer based on the determined time offset, wherein delivering, by the processor, the media content to a streaming media client using the time offset may include delivering, by the processor, the media content to the streaming media client in response to the timer expiring.

Further embodiments may include a receiver device including a memory, a receiver circuit, and a processor coupled to the memory and the receiver circuit and configured with processor-executable instructions to perform operations of the methods described above. Further embodiments may include a receiver device including means for performing functions of the methods described above. Further embodiments may include processor-readable storage media on which are stored processor-executable instructions configured to cause a processor of a receiver device to perform operations of the methods described above.

BRIEF DESCRIPTION OF THE DRAWINGS

The accompanying drawings, which are incorporated herein and constitute part of this specification, illustrate examples of the various embodiments, and together with the general description given above and the detailed description given below, serve to explain the features of the various embodiments.

DETAILED DESCRIPTION

Figure 1B:
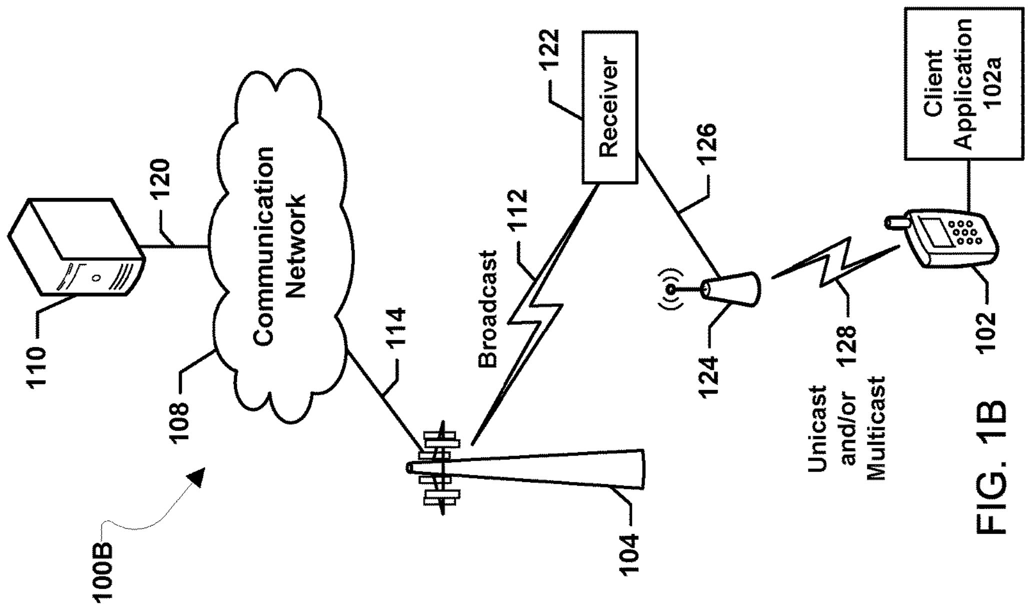
FIGS. 1A and 1B are block diagrams of communication systems suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the various embodiments or the claims.

As used herein, the terms "receiving device", and "receiver device" are used interchangeably herein to refer to any one or all of cellular telephones, smartphones, personal or mobile multimedia players, personal data assistants (PDAs), laptop computers, tablet computers, smartbooks, palmtop computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for receiving and presenting media content.

The various embodiments are described herein using the term "content server" to refer to any computing device capable of functioning as a provider of content data, such as a master exchange server, web server, mail server, document server, or any other type of server. A content server may be a dedicated computing device or a computing device including a server component (e.g., running an application which may cause the computing device to operate as a server). A server component (e.g., a server application) may be a full function server component, or a light or secondary server component (e.g., light or secondary server application) that is configured to provide synchronization services among the dynamic databases on mobile devices. A light server or secondary server may be a slimmed-down version of server-type functionality that can be implemented on a receiver device, thereby enabling the receiver device to function as an Internet server only to the extent necessary to provide the functionality described herein.

In a typical content broadcast distribution scheme, a client application of a receiving device typically anticipates receiving media objects, byte ranges, or data packets at an expected arrival time. The expected arrival time is typically reflected in a Media Presentation Description (MPD) or other data description that is included in or transmitted with the content data or in separate signaling and that provides information for the streaming media client for adaptive streaming of content. Among other things, the MPD may describe a relationship between a presentation timeline and a "wall clock" (i.e., a time that may be established at the streaming media client by broadcast or unicast means). The relationship between the presentation timeline and time may be established via other methods as well.

Time relationships between the expected arrival time and a presentation timeline provided in the MPD (or other delivery method) may be used to calculate a presentation timeline. The time relationships may reflect provided in the MPD, among other things, one or more assumptions about delays in the distribution system inside the receiving device. If for some reason there is more or less delay than the expected behavior of the broadcast system and receiver device, the streaming media client of the receiving device may launch or begin presentation of content data too early or too late. When the streaming media client begins presenting content too early, presentation stalls may result, and presenting content data too late delays presentation of content longer than strictly necessary, degrading channel change performance.

To address these limitations in conventional content broadcast distribution schemes, systems, methods, and devices of the various embodiments manage transmission delays of media content to a receiver device by determining and compensating for a protocol stack delay that may arise at the receiver device. The receiver device may calculate a time offset between a transmission time (a radiation time) of the content data or portion of content data from the sending device and the time that the content data emerges from a portion of the protocol stack (the "emergence time") of the receiver device. Based on the calculated time offset, the receiver device may determine an availability start time of the content data or content data portion. This calculated availability start time may be analogous to a "segment availability start time" as may be used in DASH for a DASH client application rendering segments. In some embodiments, the transmit infrastructure (e.g., a content server) may label the content data or content data portion with the determined radiation time (i.e., the time that the content data portion is transmitted by the content server). In some embodiments, the radiation time may be a Sender Current Time (SCT), as described in proposed standard Layered Coding Transport (LCT) Building Block, Request for Comments (RFC) 5651, <http://tools.ietf.org/html/rfc5651>, October 2009.

Figure 1A:
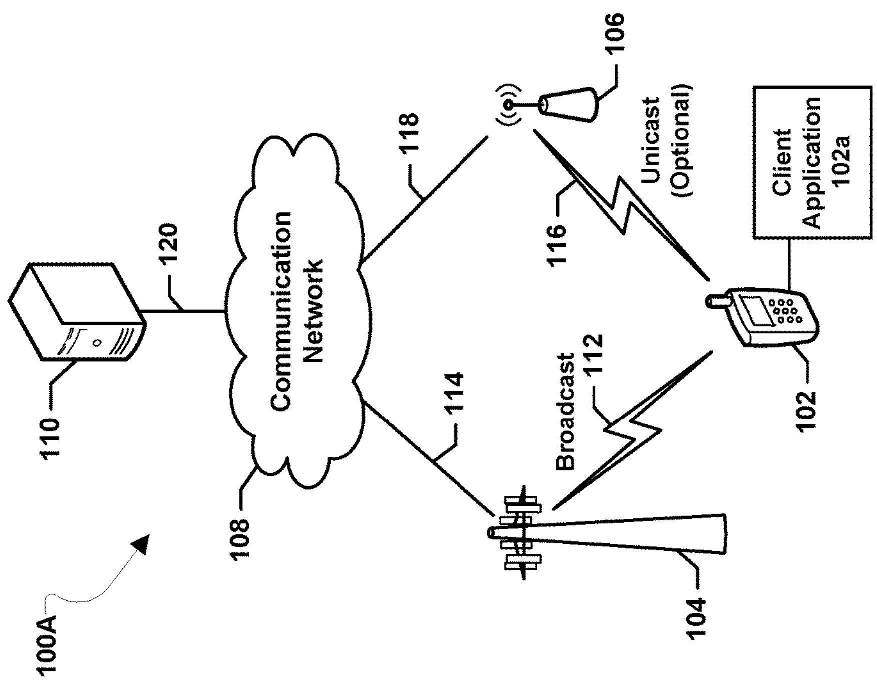

Various embodiments may be implemented in media receiver devices that may operate within a variety of communication systems 100A and 100B, two examples of which are illustrated in FIGS. 1A and 1B. Referring to FIG. 1A, a receiver device 102 may communicate with a communication network 108 that may include a base station 104, an access point 106, and a content server 110. The base station 104 may communicate with the communication network 108 over a wired or wireless communication link 114, and the access point 106 may communicate with the communication network 108 over a wired or wireless communication link 118. The communication links 114 and 118 may include fiber optic backhaul links, microwave backhaul links, and other communication links. In some embodiments, the communication network 108 may include a mobile telephony communication network.

The receiver device 102 may communicate with the base station 104 over a wireless communication link 112 and with the access point 106 over a wireless communication link 116. In some embodiments, the wireless communication link 112 may include a broadcast or multicast transmission, and the wireless communication link 116 may include a unicast transmission. In some embodiments, the unicast transmission may be optional. The content server 110 may be an application server, a media server, or another network node or network element configured to provide content data for a client application 102*a*, e.g., on the receiver device 102. The content server 110 may communicate with communication network over a wired or wireless communication link 120. The receiver device 102 may send requests for content data, such as video, audio, or multimedia content, to the content server 110 over the communication network 108, requesting delivery of the content data to the client application 102*a*. In response, the content server 110 may stream the requested content data to the receiver device 102 over one or more wired or wireless communication links 120. In some embodiments, the receiver device 102 may receive the requested content data over a single interface (e.g., over a cellular communication interface, or over a Wi-Fi communication interface). In some embodiments, the receiver device 102 may receive the content data over multiple interfaces (e.g., over Wi-Fi and cellular communication interfaces), and the receiver device 102 may receive multiple parallel streams over the multiple network interfaces.

The communication network 108 may support communications using one or more radio access technologies, and each of the wireless communication links 112 and 116 may include cellular connections that may be made through two-way wireless communication links using one or more radio access technologies. Examples of radio access technologies may include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), a radio access protocol in the Institute for Electrical and Electronics Engineers (IEEE) 802.11 family of protocols (e.g., Wi-Fi), Advanced Television System Committee (ATSC) 3.0, Digital Video Broadcasting (DVB)-T2, and other radio access technologies. While the communication links 112 and 116 are illustrated as single links, each of the communication links may include a plurality of frequencies or frequency bands, each of which may include a plurality of logical channels.

Referring to FIG. 1B, in an alternative network configuration, the base station 104 may communicate with a receiver device 122 over the communication link 112, and an access point 124 may communicate with the receiver device 122 over a wired or wireless wired or wireless communication link 126. The receiver device 102 may communicate with the access point 124 over a wireless communication link 128, which may include multicast and/or unicast transmissions. The receiver device 122 may be configured to receive content data, e.g., from the content server 110 via the base station 104, and the access point 124 may be configured to transmit content data received via the receiver device 122 to the receiver device. Thus, content data may pass through an intermediate hop via the receiver device 122 and the access point 124, e.g., via a short range transmission, such as Wi-Fi. The passage of the content data through such an intermediate hop may be referred to as "redistribution."

Figure 2:
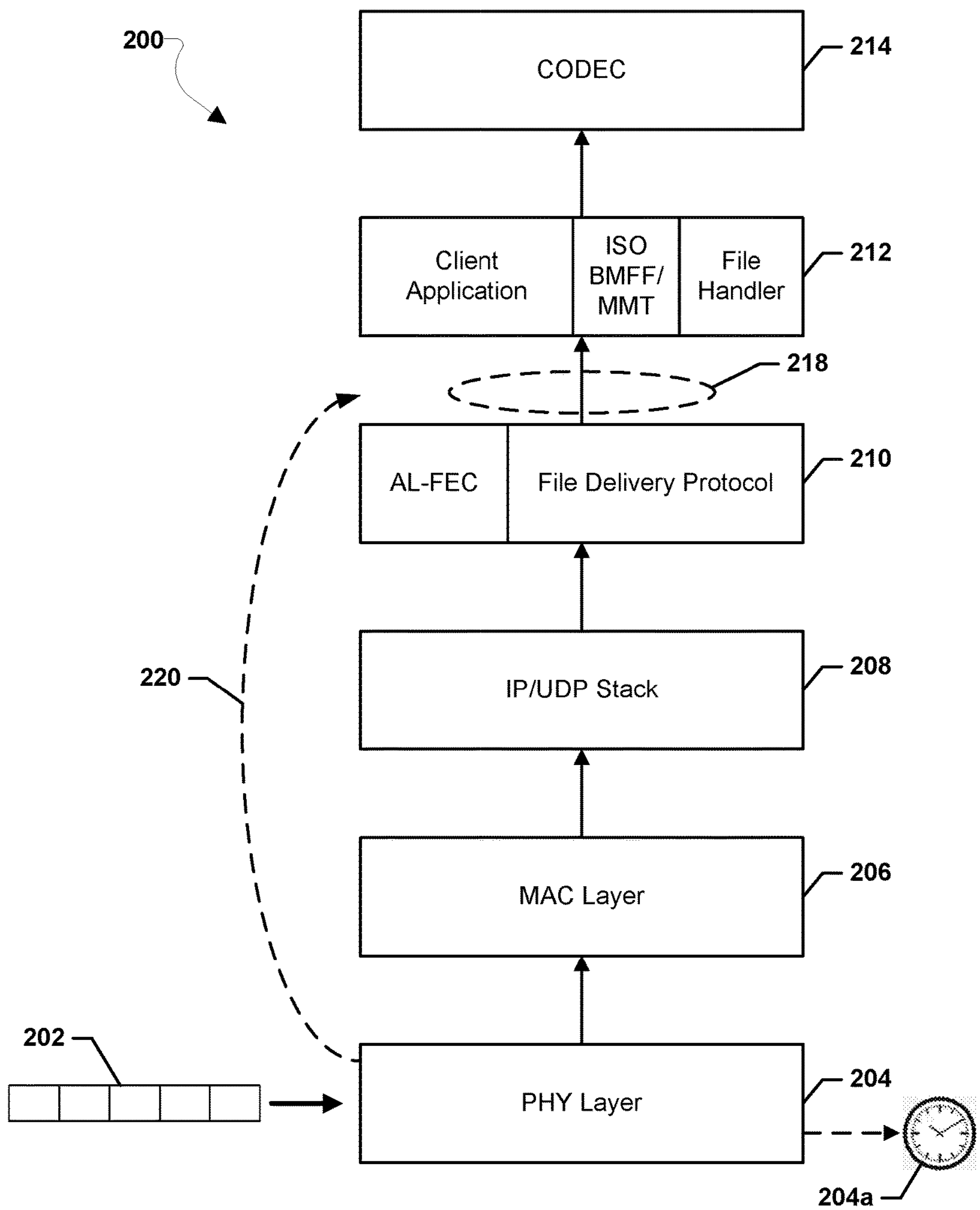
FIG. 2 is a block diagram of a protocol stack of a streaming media client suitable for use with the various embodiments.

FIG. 2 illustrates a protocol stack 200 of a streaming media client (e.g., the client application 102*a* of FIGS. 1A and 1B) suitable for implementing the various embodiments. With reference to FIGS. 1A-2, a receiver device (e.g., the receiver device 102) may receive content data 202 of physical layer ("PHY layer") 204. The PHY layer may establish a receiver local time 204*a* (e.g., a receiver "wall clock" time). The PHY layer may also provide an indication of a local time 220, such as a "tick" or other informational marketing, to higher layers of the protocol stack 200. A processor of the receiver device may derive a time (e.g., Coordinated Universal Time (UTC)) from the PHY layer tick. The physical layer may also be labeled directly with a time indication (e.g., UTC).

The content data 202 may include a media presentation description (MPD) or other media description, which may be included in the content data, such as in a header portion of the content data or some other portion of the content data. The MPD may describe information about the content data to enable a processor of the receiver device that is executing a client application (e.g., the client application 102*a*) to process and render the content data. Among other things, the MPD may describe a relationship between a presentation timeline and the wall clock (e.g., the time that may be established by the PHY layer 204). The MPD may also include timing information, such as one or more delay times assumed by the sender and written into the MPD. The MPD may further include a transmission time or radiation time from the sender of the content data. Timing information may also be incorporated in extension headers of a transport protocol, such as File Delivery over Unidirectional Transport (FLUTE) or Real-Time Object over Unidirectional Transport (ROUTE).

The physical layer 204 may provide content data to a machine access control layer 206, such as the media access control (MAC) layer. The MAC layer 206 may provide the content data to a networking protocol layer 208 for decoding the content data from a network transport protocol (e.g., internet protocol (IP), user datagram protocol (UDP), or another similar network transport protocol), such as an IP/UDP stack. The networking protocol layer 208 may provide the content data to a transport layer 210 (e.g., file delivery protocol layer, which may include forward error correction (FEC) (e.g., application layer (AL)-FEC)). The transport layer 210 may provide the content data to a client application 212, which may interpret encoding of the content data in accordance with, for example, and International Organization for Standardization (ISO) base media file format (e.g., BMFF) or Moving Picture Experts Group (MPEG) Media Transport (MMT) format. The client application 212 may provide the content data to a coding/decoding circuit (CODEC) 214 for decoding and rendering.

The content data that emerges from the transport layer 210 with a delay 218 resulting from, for example, delay within the MAC layer 206 and/or the physical (PHY) layer 204 (e.g., a buffer delay or similar data handling delay). In some embodiments, the delay 218 may also include delay introduced by intermediate distribution or redistribution, such as when a client device receives (or fetches) data from a network adapter (e.g., the receiver device 122), which may introduce some unknown distribution delay of the content data.

The delay(s) may cause the arrival time of the content data to differ from timing information (e.g., a delay time) in the MPD. Further, a time derived from the physical layer (PHY layer 204) by the receiver device may be relatively accurate, but may not reflect any delay introduced as the content data transits the protocol stack. The delays 218 may propagate as content data moves through the protocol stack 200, and may result in the content data being delivered to the client application 212 at a different time (i.e., a later time) than the client application 212 may expect based on information in the MPD, for example.

In order to determine a protocol stack delay, the PHY layer 204 may provide an indication 220 of the local time (e.g., the local time/wall clock time 204*a* of the receiver device), which the processor of the receiver device may compare to a radiation time (i.e., transmission time) of the content data. A difference between the radiation time of a data feature (e.g., a last byte of a byte range) and the wall clock time of the receiver device (which may be established via the physical layer) may indicate an amount of protocol stack delay caused by handling of the content data by the protocol stack 200. Thus, the receiver device may self-determine the protocol stack delay.

Additionally or alternatively, the processor of the receiver device may recall a protocol stack delay value that may be stored in a memory of the receiver device. For example, the receiver device may be configured with a predetermined value of a protocol stack delay that has been determined for the specific implementation of the protocol stack in the receiver device. In some embodiments, the predetermined protocol stack delay value may be derived from testing of a particular protocol stack implemented in a particular receiver device. The predetermined protocol stack delay value may be stored in a memory of the receiver device, and may be queried and retrieved by the processor of the receiver device. The predetermined protocol stack delay value may be updated, e.g., in a revised build of the protocol stack that may be provided to the receiver device.

Figure 3:
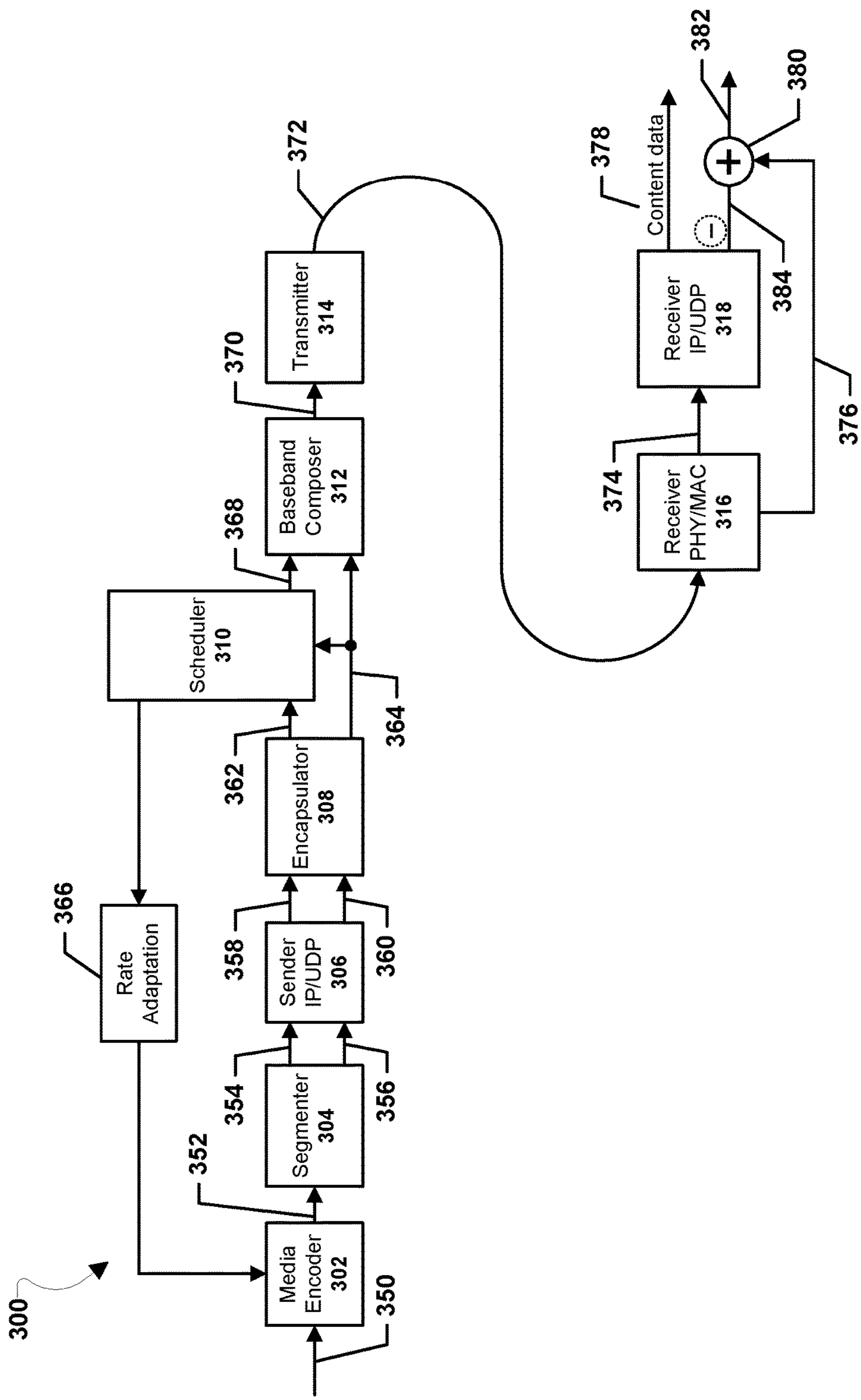
FIG. 3 is a block diagram of a communication system suitable for use with the various embodiments.

FIG. 3 is a block diagram of a communication system 300 suitable for use with the various embodiments. In various embodiments, the elements of FIG. 3 may be similar to elements of the server 110 or the receiver device 102 as described with reference to FIGS. 1A, 1B, and 2.

With reference to FIGS. 1A-3, the media encoder 302 may receive content data 350 that has been or will be requested by a receiver device (e.g., the receiver device 102), or by a client application on the receiver device (e.g., the client application 102*a*). The media encoder 302 may encode the content data and provide encoded content data 352 to a segmenter 304. The segmenter may divide the encoded content data into one or more segments. The segmenter may also write the MPD according to or in accordance to the Sender Current Time (SCT). Typically, the MPD may be in a general separate object from content data (e.g., a segment), although the MPD and the content data may be delivered to a receiver device via a common session (e.g., a ROUTE session), and/or may be delivered in a common byte range.

The segmenter 310 may provide media aware byte ranges 356 and other information 354 that may include a time quality of service (QoS) destination IP to a sender network protocol layer 306 (e.g., sender IP/UDP). The sender network protocol layer 306 may provide media aware byte ranges encoded using a network transport protocol 360 (e.g., encoded using IP, UDP, and another network transport protocol, such as ROUTE or FLUTE) and other information 358 including a forward error correction (FEC) frame tick 362 to an encapsulator 308. The encapsulator 308 may provide the FEC frame tick 362 to a scheduler 310, and may provide media aware byte ranges 364 encapsulated for network transport using, e.g., a generic stream encapsulator (GSE) protocol, to a baseband composer 312.

The scheduler 310 may provide physical layer assignments 368 to the baseband composer 312. The scheduler may also determine the transmission time (i.e., the radiation time) of the content data. In some embodiments, the transmission time may be defined in either a first byte of the content data or in a last byte of the content data. The transmission time may be a sender current time (SCT). In some embodiments, the transmission time of the content data may coincide with a latest time provided in the time QoS information 354. The scheduler 310 may also provide rate adaptation information 366 (e.g., feedback information) to the media encoder 302. In some embodiments, the scheduler 310 may determine the transmission time that is used to label content data prior to transmission.

The baseband composer 312 may provide to a transmitter 314 the content data that is ready for transport 370, as well as a baseband description of the content data. The transmitter 314 may transmit content data 372 to a receiver device. Just prior to or at the time of transmission of the content data 372, the transmitter 314 may label (e.g., encode) a portion of the content data with a transmission time (e.g., a sender current time (SCT)). The value of the transmission time may be provided by the scheduler 310, and may be encoded by the scheduler 310 or by the sender 306. In some embodiments, the sender may establish these field(s) when creating the transport, such that the size of the transmitted content data is not altered by the application of the label.

In some embodiments, the transmission time may be encoded into a header of the content data (or into a header of a portion of the content data, such as a segment). In some embodiments, the transmission time may be encoded in a ROUTE EXT_TIME header portion. In some embodiments, a header time may be defined as a first byte of a portion of the content data (e.g., of a segment). In some embodiments, the header time may be defined in a last byte of a portion of the content data (e.g., of a segment). For example, a last byte of a segment may be labeled (e.g., encoded) with an SCT that corresponds to the radiation time of the segment or a byte range (MDE).

At the receiver device, receiving elements of the protocol stack may receive the content data on the receiver device. The receiving elements may include the physical layer and the MAC layer (e.g., receiver PHY/MAC 316, which may be similar to the PHY layer 204 and the MAC layer 206 described with reference to FIG. 2). The receiver PHY/MAC 316 may provide media aware byte ranges or objects 374 that are labeled with a transmission time to a receiver network protocol layer 318 (e.g., receiver IP/UDP). The receiver network protocol layer 318 may provide content data 378 to higher layers in a receiver device protocol stack, and ultimately to a client application (e.g., the client application 102*a*).

The receiver PHY/MAC 316 may also provide an indication of a locally derived time (e.g., a wall clock time) 376 to a comparator 380, which may be a comparison operation performed by a processor of the receiver device. The receiver network protocol layer 318 may provide an indication of the content data radiation time 384 (e.g., an EXT_TIME label) to the comparator 380. The comparator 380 may compare the locally derived time (e.g., the wall clock time) and the radiation time of the content data to determine a protocol stack delay 382 of the protocol stack of the receiver device. For example, the comparator 380 may determine a protocol stack delay when the locally derived time 376 is greater than the indication of the content data radiation time 384. Using the protocol stack delay 382, the processor of the receiver device may determine an offset time, which the processor of the receiver device may use to compensate for the determined protocol stack delay. In some embodiments, the processor of the receiving device may adjust the local wall clock time of the receiver device. In some embodiments, the processor of the receiving device may adjust and/or rewrite one or more MPD parameters according to the determined offset time.

Additionally or alternatively, the processor of the receiver device may recall a protocol stack delay value that may be stored in a memory of the receiver device. For example, the receiver device may be configured with a predetermined value of a protocol stack delay that has been determined for the specific implementation of the protocol stack in the receiver device. In some embodiments, the predetermined protocol stack delay value may be derived from testing of a particular protocol stack implemented in a particular receiver device. The predetermined protocol stack delay value may be stored in a memory of the receiver device, and may be queried by the processor of the receiver device.

Figure 4A:
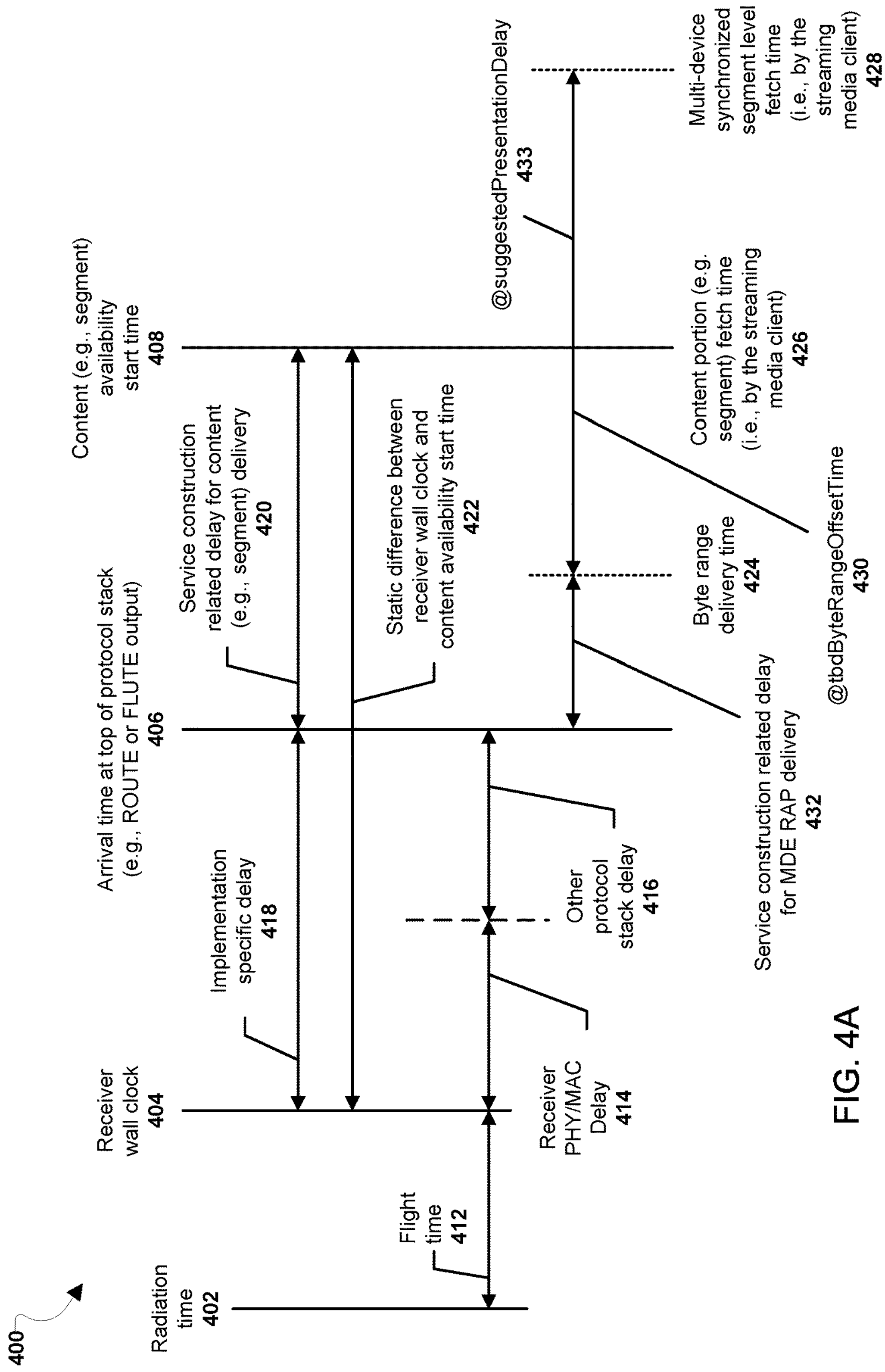
FIG. 4A is an illustration of relationships of values that may be used to determine a content availability start time according to various embodiments.

FIG. 4A illustrates relationships 400 among values that may be used to determine an availability start time of content data (e.g., a segment availability start time) according to various embodiments.

With reference to FIGS. 1A-4A, a processor of a receiver device (e.g., the receiver device 102) may determine a content availability start time 408 (e.g., a segment availability start time) according to relationships among various time values. The relationships of the various time values may be defined, for example, in an MPD included in or transmitted with content data or another similar or related description.

As described above, a sending device may label content data to be sent to receiver devices with a radiation time 402 (i.e., transmission time). Flight time 412 represents a transit time of the content data from the sending device to the receiver device. The receiver device may determine a local time 404 of the receiver device (e.g., a wall clock time), for example, from a physical layer of a protocol stack at the receiver device (e.g., the PHY layer 204).

As the content data is processed by a protocol stack of the receiver device, the content data may incur certain delays, such as a receiver PHY/MAC delay 414 and/or a delay owing to other portions of the protocol stack 416 prior to an arrival time 406 of the content data at the top of the protocol stack (e.g., the transport layer 210, such as ROUTE or FLUTE). The combination of the receiver PHY/MAC delay 414 and the delay of other portions of the protocol stack 416 may be represented as an implementation specific delay 418. A service construction related delay 420 may also be imposed on the content data following the arrival time 406 of the content data at the top of the protocol stack. The service construction related delay 420 may include a wait time to permit a sufficient amount of the content data to arrive and be buffered at the receiver device to enable smooth playback of the content data. The content availability start time 408 may be determined as a static amount of time after the receiver wall clock time 404. The static difference between the receiver wall clock in the content availability start time 422 may also be determined as a sum of an implementation specific delay 418 and the service construction related delay 420.

In some embodiments, the implementation specific delay 418 may be determined by a processor of a receiver device by comparing a radiation time of content data and the receiver wall clock time 404. Additionally or alternatively, the processor of the receiver device may recall a predetermined protocol stack delay value that may be stored in a memory of the receiver device, and may use the predetermined protocol stack delay value as the implementation specific delay 418.

To determine the content availability start time 408, the processor of the receiver device may receive at least two of the implementation specific delay 418, the service construction related delay 420, and the static difference between the receiver wall clock and content availability start time 422, either directly or indirectly. The service construction related delay 420 and/or the static difference between the receiver wall clock and content availability start time 422 may be included, for example, in an MPD of the content data. The implementation specific delay 418 may be determined by the processor of the receiver device, such as by comparing a radiation time of the content data and the receiver wall clock time 404, or by using a predetermined protocol stack delay value.

Based on the content availability start time 408, a delivery or fetch time 426 of the content data may be determined by the receiver device processor. The delivery or fetch time 426 of the content data may be based on a rendering/playback mode of the content data. For example, if the transport layer of the protocol stack (e.g., the transport layer 210) is providing (i.e., delivering) byte ranges or media delivery events (MDEs) of the content data to the client application (e.g., the client application 212), the client application typically does not need to wait as long as the content availability start time to begin rendering the byte ranges of the content data. The processor of the receiver device may determine a byte range delivery time 424 by applying a byte range offset value, such as @tbdByteRangeOffsetTime 430. If the transport layer of the protocol stack is delivering segments of the content data to the client application, the processor of the receiver device may use the content availability start time 408 as the content portion delivery/fetch time 426 for the client application to fetch (e.g., request from a buffer) content portions (e.g., segments).

In some embodiments, if multiple client applications or multiple receiving devices require synchronization so that the multiple client application/receiving devices render the content data substantially simultaneously, the processor of the receiver device may add an additional delay, such as @suggestedPresentationDelay 433, to determine a multi-device synchronized segment level fetch time 428 for each streaming media client.

Alternatively, the byte range delivery time 424 may include a time at which the transport layer (e.g., the transport layer 210) may deliver the MDE or byte range to the streaming media client (e.g., the client application 212).

In order to determine the byte range delivery time 424, the processor may determine a service construction delay 432, such as a service construction related delay for MDE representation access point (RAP) delivery. In some embodiments, the transport layer may only send an MDE or byte range marked with an RAP, which may be a syntactical indication that the byte range or MDE may be productively processed by the streaming media client.

Figure 4B:
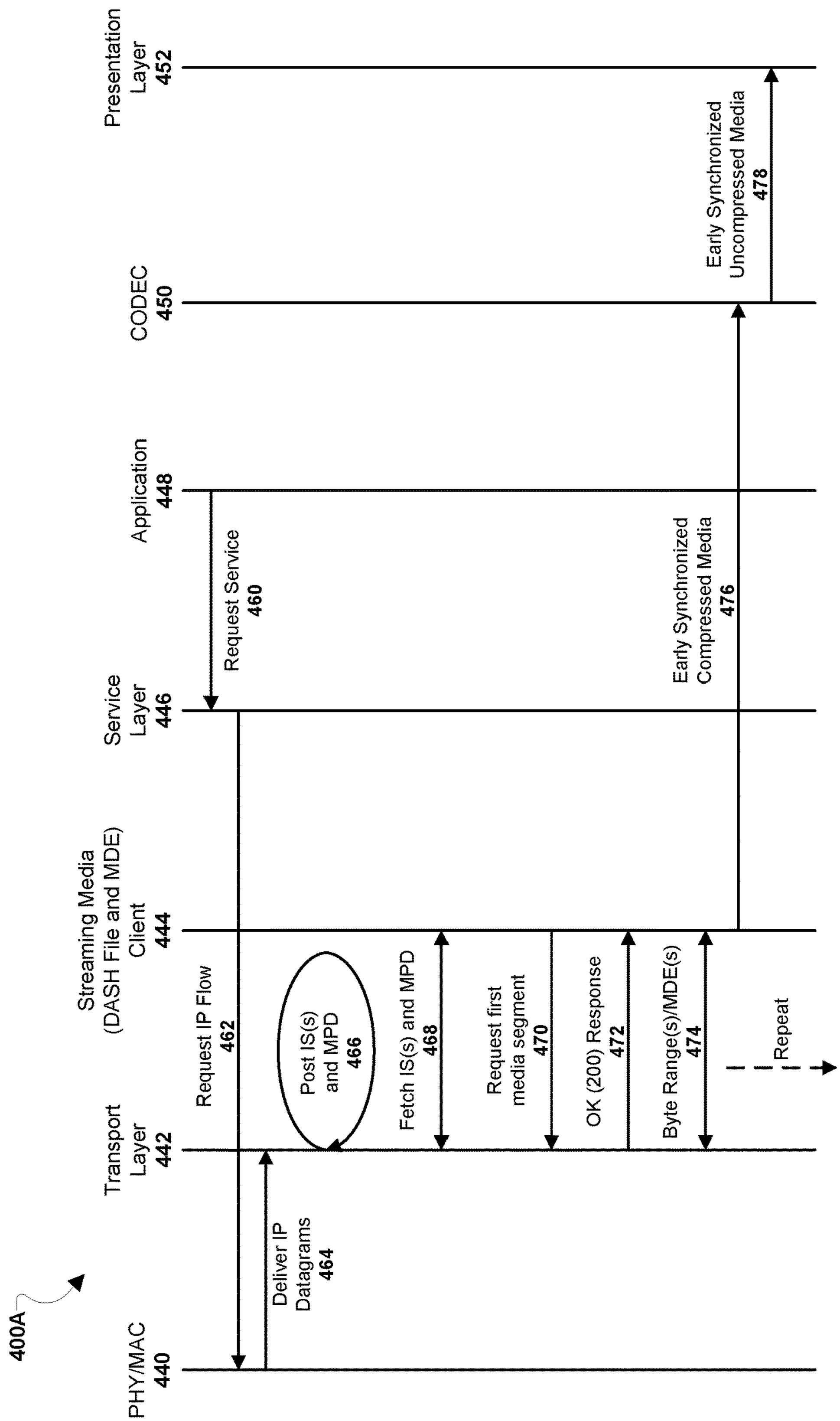
FIG. 4B is a call flow diagram illustrating a method for managing a start time of media content in a receiver device

FIG. 4B is a call flow diagram illustrating communications in a method 400A for managing a start time of media content in a receiver device according to various embodiments. The call flows of the method 400A may be implemented by a processor of a wireless receiver device (e.g., the wireless receiver device 102 of FIG. 1).

An application 448 may send a service request 460 for content data to a service layer 446, and the service layer 446 may send a request 462 for an IP flow to physical and MAC layers (e.g., PHY/MAC 440) of the protocol stack of a receiver device. The physical and MAC layers 440 may begin receiving content data, and may deliver the content data, such as IP datagrams 464, up the protocol stack to a transport layer 442. The transport layer 442 may post (e.g., make available) one or more initialization segments (IS) and an MPD associated with the content data (e.g., IS(s) and MPD 466). A streaming media client (e.g., media data event (MDE) client 444) may fetch 468 the initialization segment(s) and the MPD that is made available by the transport layer.

The transport layer 442 may receive a request for content data (e.g., a request for a first media segment 470) and may interpret the request for content data 470 as a request to send byte ranges or MDEs (media delivery events) at the earliest possible time, the determination of which is described below. In response to the request for content data 470, the transport layer 442 may send an acknowledgment of the request (e.g., OK (200) Response 472) to the streaming media client 444. The transport layer 442 then may send to the streaming media client 444 byte ranges or MDEs at a determined delivery time (e.g., the byte range delivery time 424).

In order to determine the time at which a byte range or MDE may be sent from the transport layer 442 to the streaming media client 444, a processor of the receiver device may calculate a service construction related delay for each byte range of the media or MDE (e.g., the service construction related delay for MDE RAP delivery 432). For example, the content data may include two time indications. The first time indication may be an indication of the transmission time (i.e., radiation time) of the byte range or MDE, which may be encoded in a ROUTE EXT_TIME header portion. The second time indication may be a transport layer presentation time, which is an indication of transmission time of the content data plus a service related delay specific to the byte range or MDE that may be encoded in a ROUTE EXT_ROUTE_PRESENTATION_TIME header portion.

In some embodiments, the processor may subtract the first time indication from the second time indication (e.g., the processor may subtract the EXT_TIME value from the transport layer presentation time (EXT_ROUTE_PRESENTATION_TIME) value) to determine a service related delay specific to the byte range or MDE (e.g., the service construction related delay for MDE RAP delivery 432).

To determine the time at which the transport layer may send the byte range or MDE to the streaming media client (e.g., the byte range delivery time 424 specific to the byte range or MDE), the processor may add an implementation specific delay (such as the implementation specific delay 418, e.g., the total protocol stack delay) and the service related delay specific to the byte range or MDE. Thus, the processor may determine a time at which the transport layer may deliver an MDE or byte range to the streaming media client, which may be relative to the EXT_TIME of the specific MDE or byte range.

Alternatively or additionally, the processor may add the implementation specific delay (e.g., the implementation specific delay 418 or the total protocol stack delay) and the transport layer presentation time (EXT_ROUTE_PRESENTATION_TIME) value to calculate the byte range/MDE delivery time.

Using the determined byte range delivery time, the transport layer 442 may send byte range(s) or MDE(s) 474 to the streaming media client. The streaming media client may provide the byte range/MDE 474 to a CODEC 450 (e.g., the CODEC 214) as early synchronized compressed media 476. The CODEC 450 may process the early synchronized compressed media 476 (e.g., the byte range(s) or MDE(s)), and may provide such processed content data (e.g., early synchronized uncompressed media 478) to a presentation layer 452.

Figure 5:
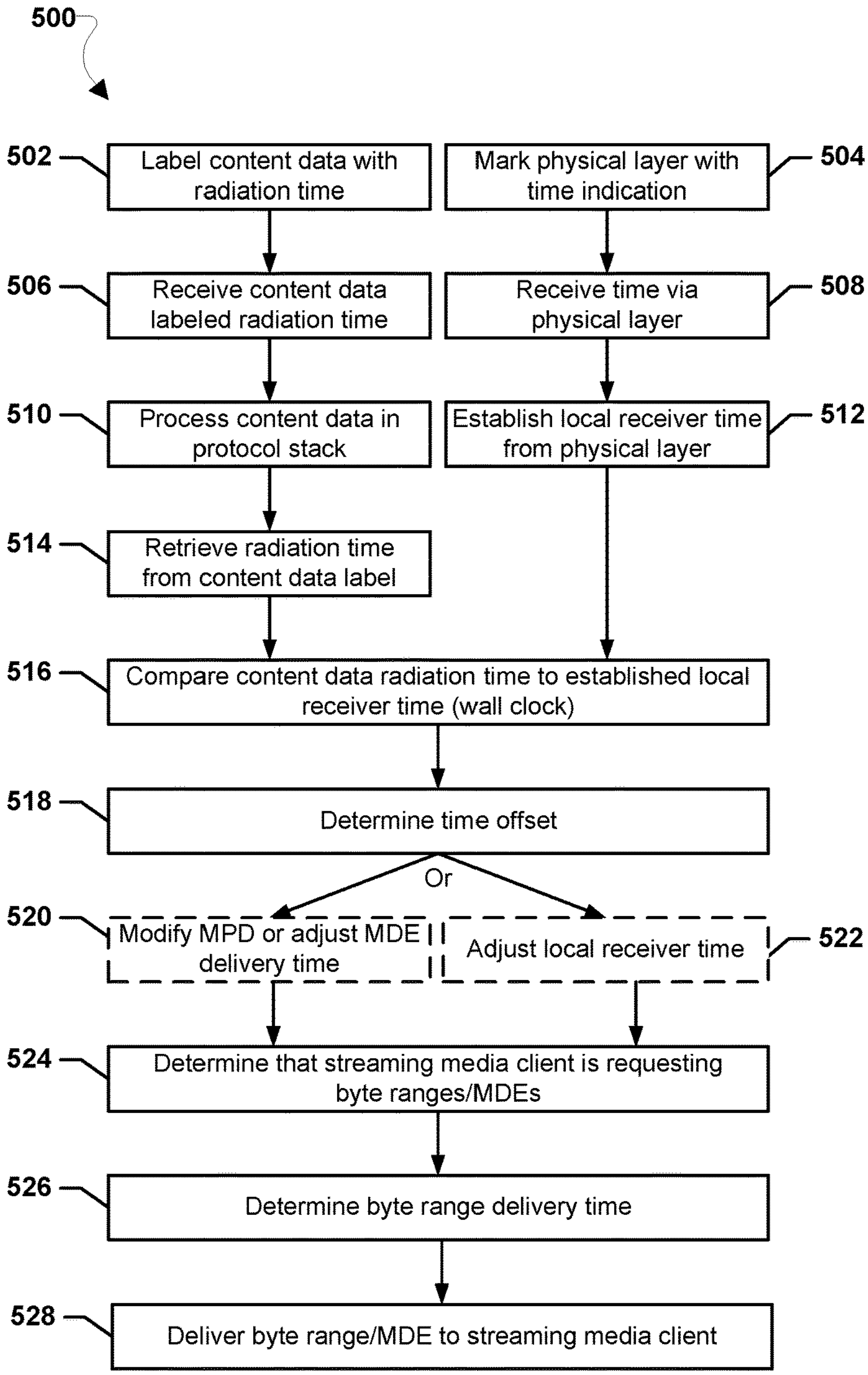
FIG. 5 is a process flow diagram illustrating a method for managing a start time of media content in a receiver device according to various embodiments.

FIG. 5 illustrates a method 500 for managing a transmission delay of media content to a receiver device according to various embodiments. The method 500 may be implemented by a processor of a receiver device (e.g., the wireless receiver device 102 of FIG. 1).

In block 502, a sending device (e.g., the content server 110) may label content data with a radiation (e.g., transmission) time, and in block 504 the sending device may mark a physical layer with a time indication (e.g., may provide a physical layer tick or other time indication to allow the receiver device to establish a local time/wall clock time). The labeling of the content data with the radiation time may be performed by a transport layer of a protocol stack of the sending device, and the marking of the physical layer with the time indication may be performed by a physical layer of the protocol stack of the sending device or the sender. The sending device may then send the labeled content data to a receiving device (e.g., the receiver device 102) via a defined transmit and receive stack of the receiver device.

In block 506, the receiver device may receive the content data labeled with the radiation time, for example, at a physical layer of the protocol stack of the receiver device (e.g., the PHY layer 204). In block 508, the receiver device may receive an indication of time via the physical layer of the protocol stack.

In block 510, a processor of the receiver device may process the received content data in the protocol stack receiver device. In block 512, the processor of the receiving indication device may establish a local time of the receiver device (e.g., a local wall clock or receiver wall clock), for example, from information provided by the physical layer of the protocol stack. In some embodiments, the physical layer of the protocol stack of the receiver device may establish the local time of the receiver device based on the physical layer marking of the time indication from the sending device.

In block 514, the processor of the receiver device may retrieve the radiation time from the content data label.

In block 516, the processor may compare the retrieved radiation time to the established local time of the receiver device and may determine a protocol stack delay based on the comparison.

In block 518, the processor may determine a time offset based on the comparison of the retrieved radiation time to the established local time of the receiver device. In some embodiments, the processor may create a timer based on the determined time offset. The processor may use the determined timer to determine a time for delivering the media content to the streaming media client.

In optional block 520, the processor may modify one or more values of an MPD of the content data using the determined time offset. In optional block 522, the processor may adjust the local time of the receiver device using the determined time offset.

In block 524, the processor may determine that a streaming media client (e.g., the client application 212 and the streaming media client 444) is requesting byte ranges or MDEs. For example, a transport layer of the protocol stack (e.g., the transport layer 210 and the transport layer 442) may interpret a request for content data as a request to send byte ranges or MDEs at an earliest possible time.

In block 526, the processor may determine a byte range delivery time (e.g., the byte range delivery time 424), such as a time at which the transport layer may deliver an MDE or byte range to the streaming media client. In some embodiments, the processor may determine the byte range delivery time by adding an implementation specific delay (e.g., the implementation specific delay 418, which may be the total protocol stack delay) and a service related delay specific to the byte range or MDE (e.g., the service construction related delay for MDE RAP delivery 430). Alternatively or additionally, the processor may calculate the byte range/MDE delivery time by adding the implementation specific delay (i.e., the implementation specific delay 418) and a transport layer presentation time (EXT_ROUTE_PRESENTATION_TIME) value.

In block 528, the processor may deliver a byte range or MDE to the streaming media client using the byte range delivery time. For example, using the byte range delivery time, the processor may deliver content data (e.g., a byte range or MDE) to an interface of the client application (e.g., a ROUTE/DASH interface) as streaming byte ranges/MDEs. In some embodiments, the processor may determine that the timer created based on the determined time offset has expired. In such embodiments, the processor may deliver the media content to the streaming media client in response to the timer expiring (e.g., in response to determining that the timer has expired).

Figure 6:
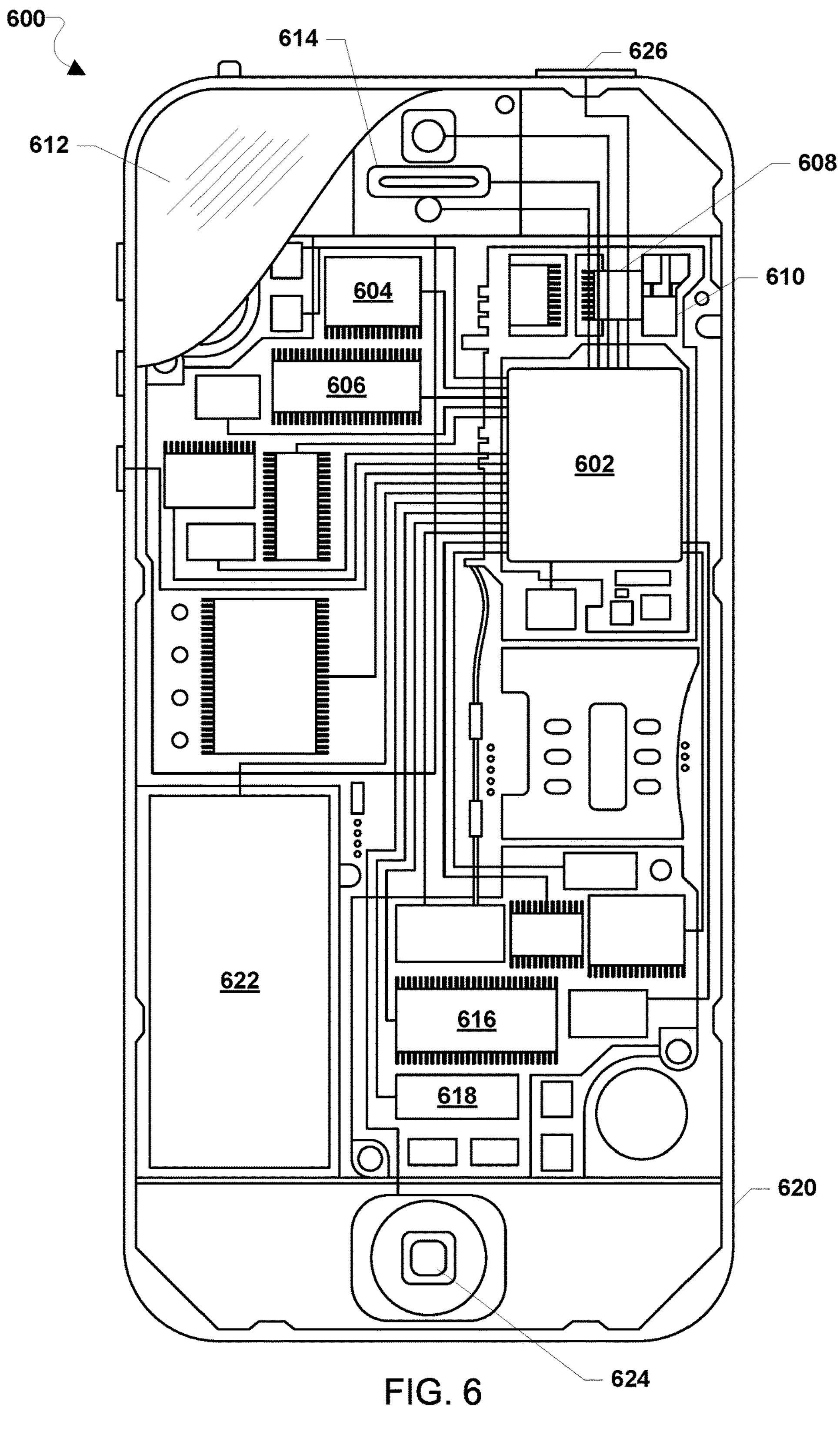
FIG. 6 is a component diagram of an example receiver device suitable for use with the various embodiments.

The various embodiments may be implemented in any of a variety of receiver devices, an example of which is illustrated in FIG. 6. For example, the receiver device 600 may include a processor 602 coupled to internal memories 604 and 606. Internal memories 604 and 606 may be volatile or non-volatile memories, and may also be secure and/or encrypted memories, or unsecure and/or unencrypted memories, or any combination thereof. The processor 602 may also be coupled to a touch screen display 612, such as a resistive-sensing touch screen, capacitive-sensing touch screen infrared sensing touch screen, or the like. Additionally, the display of the receiver device 600 need not have touch screen capability. The receiver device 600 may have one or more radio signal transceivers 608 (e.g., Peanut®, Bluetooth®, Zigbee®, Wi-Fi, radio frequency (RF) radio) and antennae 610, for sending and receiving, coupled to each other and/or to the processor 602. The receiver device 600 may include a cellular network interface, such as wireless modem chip 616, that enables communication via a cellular data network (e.g., CDMA, TDMA, GSM, PCS, 3G, 4G, LTE, ATSC 3.0, DVB-T2 or any other type of cellular or broadcast data network) and is coupled to the processor 602. The receiver device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port. The receiver device 600 may also include speakers 614 for providing audio outputs. The receiver device 600 may also include a housing 620, constructed of a plastic, metal, or a combination of materials, for containing all or some of the components discussed herein. The receiver device 600 may include a power source 622 coupled to the processor 602, such as a disposable or rechargeable battery. The rechargeable battery may also be coupled to the peripheral device connection port to receive a charging current from a source external to the receiver device 600. The receiver device 600 may also include a physical button 624 for receiving user inputs, and a power button 626 for turning the receiver device 600 on and off.

Figure 7:
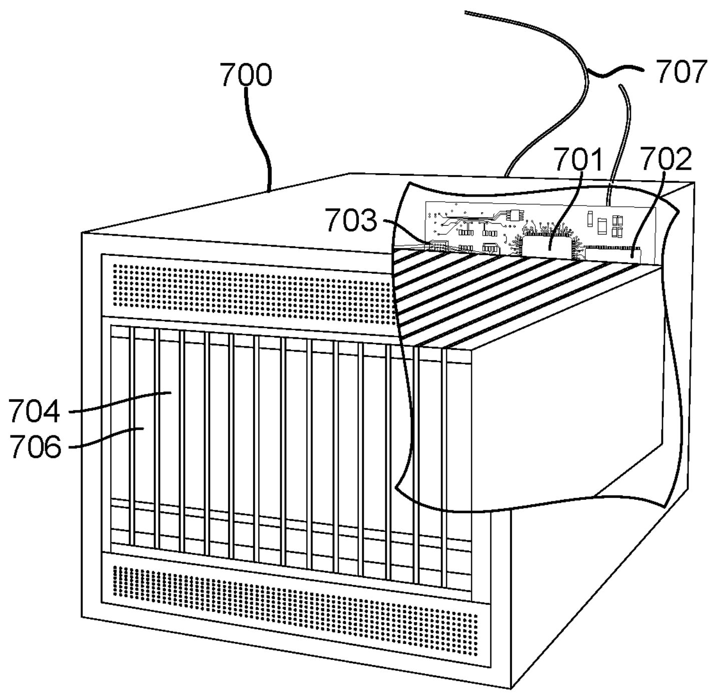
FIG. 7 is a component diagram of an example server suitable for use with the various embodiments.

The various embodiments may also be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 704. The server 700 may also include a floppy disc drive, compact disc (CD) or DVD disc drive 706 coupled to the processor 701. The server 700 may also include network access ports 703 coupled to the processor 701 for establishing network interface connections with a network 707, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 602 and 702 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 604, 606, 702, 704 before they are accessed and loaded into the processors 602 and 701. The processors 602 and 701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602 and 701 including internal memory or removable memory plugged into the device and memory within the processor 602 and 701 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, components, circuits, and algorithm operations described in connection with the embodiments disclosed herein may be implemented as electronic hardware, computer software, or combinations of both. To clearly illustrate this interchangeability of hardware and software, various illustrative components, blocks, components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or a non-transitory processor-readable storage medium. The steps of a method or algorithm disclosed herein may be embodied in a processor-executable software component that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method for managing a start time of media content in a receiver device, comprising:

receiving, by a processor implemented in circuitry of the receiver device, media content associated with a transmission time from a sending device;

determining, by the processor, a service construction delay of the media content to be imposed on the media content, by the processor of the receiver device, following the arrival of the media content at the top of a protocol stack;

determining, by the processor, a time offset of the media content based on the service construction delay;

adjusting, by the processor, the service construction delay using the time offset; and delivering, by the processor, the media content from the top of the protocol stack to a streaming media client using the adjusted service construction delay.

2. The method of claim 1, further comprising:

determining, by the processor, a start time of the media content based on the determined time offset, wherein delivering, by the processor, the media content from the top of the protocol stack to a streaming media client using the adjusted service construction delay comprises:

delivering, by the processor, the media content from the top of the protocol stack to the streaming media client based on the start time.

3. The method of claim 1, further comprising:

determining, by the processor, a protocol stack delay of the media content.

4. The method of claim 3, wherein determining the protocol stack delay of the media content comprises:

determining, by the processor, a local time of the receiver device; and comparing, by the processor, the transmission time with the local time of the receiver device.

5. The method of claim 3, wherein determining the time offset of the media content comprises determining the time offset based on the protocol stack delay.

6. The method of claim 1, wherein determining, by the processor, the service construction delay of the media content comprises determining the service construction delay based on a transport layer presentation time of the media content.

7. The method of claim 1, further comprising:

receiving, by the processor, a request for a byte range of the media content, wherein determining the service construction delay of the media content comprises determining the service construction delay based on a service construction delay for the requested byte range of the media content.

8. The method of claim 1, wherein, in response to a request from a client application to a transport layer of a protocol stack for media content arriving before the requested media content is fully present in a transport buffer, the transport layer of the protocol stack interprets the request as a request for byte range delivery of the requested media content.

9. The method of claim 2, wherein determining the start time of the media content based on the determined time offset comprises determining a sum of a determined protocol stack delay of the media content and a transport layer presentation time.

10. The method of claim 3, wherein the protocol stack delay of the media content comprises a delay time due to processing of the media content by a protocol stack of the receiver device.

11. The method of claim 3, wherein determining a protocol stack delay of the media content comprises determining the protocol stack delay after a media content portion of the media content is processed by a transport layer of a protocol stack of the receiver device.

12. The method of claim 3, wherein determining a protocol stack delay of the media content comprises retrieving a predetermined protocol stack delay value from a memory of the receiver device.

13. The method of claim 2, wherein determining a start time of the media content comprises:

modifying, by the processor, a media presentation description of the media content based on the time offset; and determining, by the processor, a start time of the media content based on the modified media presentation description.

14. The method of claim 2, wherein determining a start time of the media content comprises:

modifying, by the processor, a local time of the receiver device based on the time offset; and determining, by the processor, a start time of the media content based on the modified local time.

15. The method of claim 1, wherein the media content comprises a header portion labeled with the associated transmission time from the sending device.

16. The method of claim 1, further comprising:

creating, by the processor, a timer based on the determined time offset;

wherein delivering, by the processor, the media content from the top of the protocol stack to a streaming media client using the time offset comprises delivering, by the processor, the media content from the top of the protocol stack to the streaming media client in response to the timer expiring.

17. A receiver device, comprising:

a memory;

a receiver circuit; and a processor implemented in circuitry, coupled to the memory and the receiver circuit, and configured with processor-executable instructions to:

receive media content associated with a transmission time from a sending device;

determine a service construction delay of the media content to be imposed on the media content by the processor of the receiver device following the arrival of the media content at the top of a protocol stack;

determine a time offset of the media content based on the service construction delay;

adjust the service construction delay using the time offset; and deliver the media content from the top of the protocol stack to a streaming media client using the adjusted service construction delay.

18. The receiver device of claim 17, wherein the processor is further configured with processor-executable instructions to:

determine a start time of the media content based on the determined time offset, and wherein the processor-executable instructions to deliver the media content from the top of the protocol stack to the streaming media client using the adjusted service construction delay is performed by delivering the media content to the streaming media client based on the start time.

19. The receiver device of claim 17, wherein the processor is further configured with processor-executable instructions to:

determine a protocol stack delay of the media content.

20. The receiver device of claim 19, wherein the processor is further configured with processor-executable instructions to determine the protocol stack delay of the media content by:

determining a local time of the receiver device; and comparing the transmission time with the local time of the receiver device.

21. The receiver device of claim 19, wherein the processor is further configured with processor-executable instructions to the time offset of the media content by determining the time offset based on the protocol stack delay.

22. The receiver device of claim 17, wherein the processor is further configured with processor-executable instructions to the service construction delay of the media content by determining the service construction delay based on a transport layer presentation time of the media content.

23. The receiver device of claim 17, wherein the processor is further configured with processor-executable instructions to:

receive a request for a byte range of the media content, determine the service construction delay of the media content by determining the service construction delay based on a service construction delay for the requested byte range of the media content.

24. The receiver device of claim 17, wherein the processor is further configured with processor-executable instructions such that in response to a request from a client application to a transport layer of a protocol stack for media content arriving before the requested media content is fully present in a transport buffer, the transport layer of the protocol stack interprets the request as a request for byte range delivery of the requested media content.

25. The receiver device of claim 18, wherein the processor is further configured with processor-executable instructions to determine the start time of the media content based on the determined time offset by determining a sum of a determined protocol stack delay of the media content and a transport layer presentation time.

26. The receiver device of claim 19, wherein the protocol stack delay of the media content comprises a delay time due to processing of the media content by a protocol stack of the receiver device.

27. The receiver device of claim 19, wherein the processor is further configured with processor-executable instructions to determine a protocol stack delay of the media content by determining the protocol stack delay after a media content portion of the media content is processed by a transport layer of a protocol stack of the receiver device.

28. The receiver device of claim 19, wherein the processor is further configured with processor-executable instructions to determine a protocol stack delay of the media content by retrieving a predetermined protocol stack delay value from a memory of the receiver device.

29. The receiver device of claim 18, wherein the processor is further configured with processor-executable instructions to determine a start time of the media content by:

modifying a media presentation description of the media content based on the time offset; and determining a start time of the media content based on the modified media description presentation.

30. The receiver device of claim 18, wherein the processor is further configured with processor-executable instructions to determine a start time of the media content by:

modifying a local time of the receiver device based on the time offset; and determining a start time of the media content based on the modified local time.

31. The receiver device of claim 17, wherein the media content comprises a header portion labeled with the associated transmission time from the sending device.

32. The receiver device of claim 17, wherein the processor is further configured with processor-executable instructions to:

create a timer based on the determined time offset; and wherein the processor-executable instructions to deliver the media content from the top of the protocol stack to the streaming media client using the adjusted service construction delay is performed by delivering the media content from the top of the protocol stack to the streaming media client in response to the timer expiring.

33. A non-transitory processor readable storage medium having stored thereon processor-executable instructions configured to cause a processor implemented in circuitry of a receiver device to perform operations comprising:

receiving media content associated with a transmission time from a sending device;

determining a service construction delay of the media content to be imposed on the media content by the receiver device following the arrival of the media content at the top of a protocol stack;

determining a time offset of the media content based on the service construction delay;

adjusting the service construction delay using the time offset; and delivering the media content from the top of the protocol stack to a streaming media client using the adjusted service construction delay.

34. The non-transitory processor readable storage medium of claim 33, wherein the processor-executable instructions are configured to cause the processor of the receiver device to perform operations further comprising:

determining a start time of the media content based on the determined time offset, wherein delivering the media content from the top of the protocol stack to a streaming media client using the adjusted service construction delay comprises delivering the media content from the top of the protocol stack to the streaming media client based on the start time.

35. The non-transitory processor readable storage medium of claim 33, wherein the processor-executable instructions are configured to cause the processor of the receiver device to perform operations further comprising:

determining a protocol stack delay of the media content.

36. The non-transitory processor readable storage medium of claim 35, wherein the processor-executable instructions are configured to cause the processor of the receiver device to perform operations such that determining the protocol stack delay of the media content comprises:

determining a local time of the receiver device; and comparing the transmission time with the local time of the receiver device.

37. The non-transitory processor readable storage medium of claim 35, wherein the processor-executable instructions are configured to cause the processor of the receiver device to perform operations such that determining the time offset of the media content comprises determining the time offset based on the protocol stack delay.

38. The non-transitory processor readable storage medium of claim 33, wherein the processor-executable instructions are configured to cause the processor of the receiver device to perform operations such that determining, by the processor, the service construction delay of the media content comprises determining the service construction delay based on a transport layer presentation time of the media content.

39. The non-transitory processor readable storage medium of claim 33, wherein the processor-executable instructions are configured to cause the processor of the receiver device to perform operations further comprising:

receiving, by the processor, a request for a byte range of the media content, wherein determining the service construction delay of the media content comprises determining the service construction delay based on a service construction delay for the requested byte range of the media content.

40. The non-transitory processor readable storage medium of claim 33, wherein the processor-executable instructions are configured to cause the processor of the receiver device to perform operations such that, in response to a request from a client application to a transport layer of a protocol stack for media content arriving before the requested media content is fully present in a transport buffer, the transport layer of the protocol stack interprets the request as a request for byte range delivery of the requested media content.

41. The non-transitory processor readable storage medium of claim 34, wherein the processor-executable instructions are configured to cause the processor of the receiver device to perform operations such that determining the start time of the media content based on the determined time offset comprises determining a sum of a determined protocol stack delay of the media content and a transport layer presentation time.

42. The non-transitory processor readable storage medium of claim 35, wherein the processor-executable instructions are configured to cause the processor of the receiver device to perform operations such that the protocol stack delay of the media content comprises a delay time due to processing of the media content by a protocol stack of the receiver device.

43. The non-transitory processor readable storage medium of claim 35, wherein the processor-executable instructions are configured to cause the processor of the receiver device to perform operations such that determining the protocol stack delay of the media content comprises determining the protocol stack delay after a media content portion of the media content is processed by a transport layer of a protocol stack of the receiver device.

44. The non-transitory processor readable storage medium of claim 35, wherein the processor-executable instructions are configured to cause the processor of the receiver device to perform operations such that determining the protocol stack delay of the media content comprises retrieving a predetermined protocol stack delay value from a memory of the receiver device.

45. The non-transitory processor readable storage medium of claim 34, wherein the processor-executable instructions are configured to cause the processor of the receiver device to perform operations such that determining the start time of the media content comprises:

modifying a media presentation description of the media content based on the time offset; and determining a start time of the media content based on the modified media description presentation.

46. The non-transitory processor readable storage medium of claim 34, wherein the processor-executable instructions are configured to cause the processor of the receiver device to perform operations such that determining a start time of the media content comprises:

modifying a local time of the receiver device based on the time offset; and determining, a start time of the media content based on the modified local time.

47. The non-transitory processor readable storage medium of claim 33, wherein the processor-executable instructions are configured to cause the processor of the receiver device to perform operations such that the media content comprises a header portion labeled with the associated transmission time from the sending device.

48. The non-transitory processor readable storage medium of claim 33, wherein the processor-executable instructions are configured to cause the processor of the receiver device to perform operations further comprising:

creating a timer based on the determined time offset;

wherein delivering the media content from the top of the protocol stack to a streaming media client using the time offset comprises delivering the media content from the top of the protocol stack to the streaming media client in response to the timer expiring.

49. A receiver device, comprising:

means for receiving media content associated with a transmission time from a sending device;

means for determining a service construction delay of the media content to be imposed on the media content by the receiver device following the arrival of the media content at the top of a protocol stack;

means for determining a time offset of the media content based on the service construction delay;

means for adjusting the service construction delay using the time offset; and means for delivering the media content from the top of the protocol stack to a streaming media client using the adjusted service construction delay.

50. The receiver device of claim 49, further comprising:

means for determining a start time of the media content based on the determined adjusted service construction delay, wherein means for delivering the media content from the top of the protocol stack to a streaming media client using the time offset comprises means for delivering the media content from the top of the protocol stack to the streaming media client based on the start time.

51. The receiver device of claim 49, further comprising:

means for determining a protocol stack delay of the media content.

52. The receiver device of claim 51, wherein means for determining the protocol stack delay of the media content comprises:

means for determining a local time of the receiver device; and means for comparing the transmission time with the local time of the receiver device.

53. The receiver device of claim 51, wherein means for determining the time offset of the media content comprises means for determining the time offset based on the protocol stack delay.

54. The receiver device of claim 49, wherein means for determining the service construction delay of the media content comprises means for determining the service construction delay based on a transport layer presentation time of the media content.

55. The receiver device of claim 49, further comprising:

means for receiving a request for a byte range of the media content, wherein means for determining the service construction delay of the media content comprises means for determining the service construction delay based on a service construction delay for the requested byte range of the media content.

56. The receiver device of claim 49, wherein, in response to a request from a client application to a transport layer of a protocol stack for media content arriving before the requested media content is fully present in a transport buffer, the transport layer of the protocol stack interprets the request as a request for byte range delivery of the requested media content.

57. The receiver device of claim 50, wherein the means for determining the start time of the media content based on the determined time offset comprises means for determining a sum of a determined protocol stack delay of the media content and a transport layer presentation time.

58. The receiver device of claim 51, wherein the protocol stack delay of the media content comprises a delay time due to processing of the media content by a protocol stack of the receiver device.

59. The receiver device of claim 51, wherein means for determining a protocol stack delay of the media content comprises means for determining the protocol stack delay after a media content portion of the media content is processed by a transport layer of a protocol stack of the receiver device.

60. The receiver device of claim 51, wherein means for determining a protocol stack delay of the media content comprises means for retrieving a predetermined protocol stack delay value from a memory of the receiver device.

61. The receiver device of claim 50, wherein means for determining a start time of the media content comprises:

means for modifying a media presentation description of the media content based on the time offset; and means for determining a start time of the media content based on the modified media description presentation.

62. The receiver device of claim 50, wherein means for determining a start time of the media content comprises:

means for modifying a local time of the receiver device based on the time offset; and means for determining a start time of the media content based on the modified local time.

63. The receiver device of claim 49, wherein the media content comprises a header portion labeled with the associated transmission time from the sending device.

64. The receiver device of claim 49, further comprising:

means for creating a timer based on the determined time offset;

wherein means for delivering the media content from the top of the protocol stack to a streaming media client using the time offset comprises means for delivering the media content from the top of the protocol stack to the streaming media client in response to the timer expiring.

* * * * *